(12) United States Patent
Magerramov et al.

(10) Patent No.: US 9,454,407 B2
(45) Date of Patent: *Sep. 27, 2016

(54) SERVICE RESOURCE ALLOCATION

(71) Applicant: Amazon Technologies, Inc., Seattle, WA (US)

(72) Inventors: Joseph Magerramov, Seattle, WA (US); Ganesh Subramaniam, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/796,280

(22) Filed: Jul. 10, 2015

(65) Prior Publication Data

US 2015/0317188 A1   Nov. 5, 2015

Related U.S. Application Data

(63) Continuation of application No. 13/705,363, filed on Dec. 5, 2012, now Pat. No. 9,081,623.

(51) Int. Cl.
*G06F 9/50* (2006.01)
*G06F 9/54* (2006.01)

(52) U.S. Cl.
CPC .............. *G06F 9/5083* (2013.01); *G06F 9/50* (2013.01); *G06F 9/547* (2013.01); *G06F 2209/504* (2013.01); *G06F 2209/5022* (2013.01)

(58) Field of Classification Search
None
See application file for complete search history.

(56) References Cited

U.S. PATENT DOCUMENTS

| | | |
|---|---|---|
| 2004/0078532 A1 | 4/2004 | Tremaine |
| 2012/0159367 A1 | 6/2012 | Calcaterra et al. |
| 2014/0058871 A1 | 2/2014 | Marr et al. |
| 2014/0137110 A1 | 5/2014 | Engle et al. |

*Primary Examiner* — Qing Wu
(74) *Attorney, Agent, or Firm* — Thomas | Horstemeyer, LLP

(57) ABSTRACT

Disclosed are various embodiments for a resource allocation application. Usage data for application program interfaces is aggregated over time. Limits for an allocation of resources for each of the application program interfaces are calculated as a function of the usage data. Limits are recalculated as new application program interfaces are added.

20 Claims, 5 Drawing Sheets

SERVICE RESOURCE ALLOCATION

CROSS-REFERENCE TO RELATED APPLICATIONS

This application is a Continuation of and claims priority to U.S. application Ser. No. 13/705,363 titled "Service Resource Allocation", filed Dec. 5, 2012, which is incorporated herein by reference in its entirety.

BACKGROUND

Services may share a pool of available resources to perform their functions. Problems arise when resource distributions result in service unavailability.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Computing resources are often shared amongst many executed services. Examples of resources may include threads, disk space, network bandwidth, or other resources. When a service or an application program interface (API) of a service uses an excessive amount of resources, it may leave the other services or APIs lacking in resources. This results in unavailability for clients attempting to access the services or APIs.

Limits can be imposed with respect to the APIs in order to prevent one API from monopolizing the resource pool. Manually implemented limits have several disadvantages. As static values, the manually implemented limits cannot adjust to changes in a dynamic computing environment. Limits cannot be increased in periods of available system capacity, and cannot be decreased to account for API unavailability. Additionally, as new APIs that access the same resource pool are added, new limits must be imposed across all APIs which increases the administrator workload.

A resource allocation application dynamically determines resource allocation limits with respect to the APIs. The limits are recalculated as new APIs are added. The limits may be calculated as a function of past usage data with respect to the individual APIs, priority tiers assigned to the APIs, or other data. Additionally, resource limits can be reallocated between subsets of APIs in periods of high system capacity or heavy transaction loads on the APIs.

In the following discussion, a general description of the system and its components is provided, followed by a discussion of the operation of the same.

Figure 1:
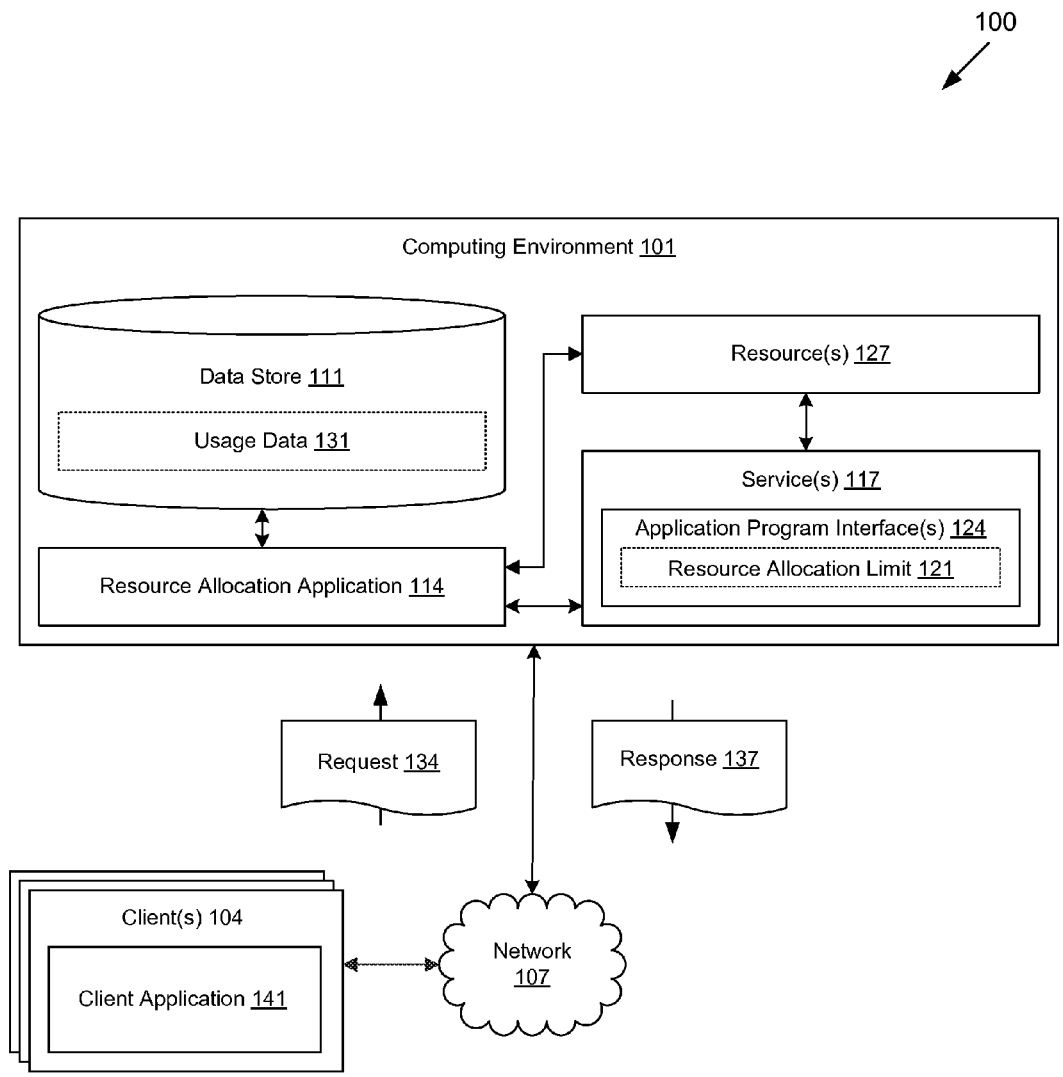
FIG. 1 is a drawing of a networked environment according to various embodiments of the present disclosure.

With reference to FIG. 1, shown is a networked environment 100 according to various embodiments. The networked environment 100 includes a computing environment 101 and a client 104, which are in data communication with each other via a network 107. The network 107 includes, for example, the Internet, intranets, extranets, wide area networks (WANs), local area networks (LANs), wired networks, wireless networks, or other suitable networks, etc., or any combination of two or more such networks.

The computing environment 101 may comprise, for example, a server computer or any other system providing computing capability. Alternatively, the computing environment 101 may employ a plurality of computing devices that may be employed that are arranged, for example, in one or more server banks or computer banks or other arrangements. Such computing devices may be located in a single installation or may be distributed among many different geographical locations. For example, the computing environment 101 may include a plurality of computing devices that together may comprise a cloud computing resource, a grid computing resource, and/or any other distributed computing arrangement. In some cases, the computing environment 101 may correspond to an elastic computing resource where the allotted capacity of processing, network, storage, or other computing-related resources may vary over time.

Various applications and/or other functionality may be executed in the computing environment 101 according to various embodiments. Also, various data is stored in a data store 1111 that is accessible to the computing environment 101. The data store 111 may be representative of a plurality of data stores 111 as can be appreciated. The data stored in the data store 111, for example, is associated with the operation of the various applications and/or functional entities described below.

The components executed on the computing environment 101, for example, include a resource allocation application 114 and services 117, and other applications, services, processes, systems, engines, or functionality not discussed in detail herein. The resource allocation application 114 is executed to calculate resource allocation limits 121 for APIs 124 of the services 117, thereby limiting an amount of resources 127 available to execute the functionality implemented in the APIs 124. The resource allocation application 114 may also facilitate the allocation of the resources 127 to the APIs 124 as a function of the resource allocation limits 121.

The resource allocation limits 121 may be calculated as a function of usage data 131 of the APIs 124. Usage data 131 may comprise, for example, an amount of transactions per second executed with respect to a corresponding one of the APIs over a period of time. Usage data 131 may also comprise an amount of processing power, network bandwidth, disk reads, disk writes, socket connections, database connections, or other data used over a period of time. The usage data 131 may comprise aggregates of the data over a time period, samples taken at predefined intervals, or other information. The usage data 131 may be generated by a data sampling or aggregation agent, generated as a function of log or record data, or generated by some other approach.

In embodiments in which the resource allocation limits 121 are calculated as a function of usage data 131, the resource allocation application 114 may calculate an aggregate value with respect to the usage data 131. For example, in calculating a resource allocation limit 121 for an API 124, the resource allocation application 114 may calculate an average transactions per second as a function of sampled transactions per second embodied in the usage data 131.

Additionally, the resource allocation application 114 may calculate a weighted average of the usage data 131. Weights assigned to the usage data 131 may be a function of the age of the usage data 131. For example, older usage data 131 may be weighted higher than newer usage data 131. Conversely, newer usage data 131 may be weighted higher than older usage data 131. Weighted averages of the usage data 131 may be calculated by other approaches as well. Other aggregate functions such as minimums, maximums, summations, or other aggregate functions may also be used to calculate the resource allocation limit 121 as a function of the usage data 131.

The resource allocation application 114 may calculate the resource allocation limits 121 as a function of priority tiers assigned to the APIs 124. As a non-limiting example, each of the APIs 124 may be assigned one of a high, medium, and low priority tier. In such an embodiment the corresponding one of the resource allocation limits 121 may be calculated as being higher for high tier APIs 124 and lower for low tier APIs 124. The resource allocation application 114 may also calculate the resource allocation limits 121 by another approach.

The resource allocation application 114 may recalculate the resource allocation limits 121 in response to an event, a predefined condition, or other criteria. For example, the resource allocation application 114 may recalculate the resource allocation limits 121 in response to a new API 124 being added to a set of APIs 124 associated with the same service 117 or sharing the same pool of resources 127. The resource allocation application 114 may recalculate the resource allocation limits 121 in response to input from a user or administrator of the computing environment 101, a state of resource 127 usage, or in response to another event or condition.

In some embodiments, the resource allocation application 114 may perform a reallocation of resource allocation limits 121 for a subset of the APIs 124. For example, a first API 124 may "steal" a portion of the resource allocation limit 121 corresponding to a second API 124. This comprises increasing the resource allocation limit 121 corresponding to the first API 124 and decreasing the resource allocation limit 121 corresponding to the second API 124.

The reallocation of the resource allocation limits 121 may be performed responsive to an event, predefined condition, or other criteria. In one embodiment, resource allocation limits 121 are reallocated responsive to a resource 127 usage of a first API 124 approaching the resource allocation limit 121 corresponding to the first API 124. This may comprise the resource 127 usage exceeding a threshold determined as a function of the resource allocation limit 121, the resource 127 usage equaling the resource allocation limit 121, or some other approach. Responsive to the resource 127 usage of the first API 124 approaching the resource allocation limit 121, the resource allocation application 114 will decrease the resource allocation limit 121 of a second API 124 and increase the resource allocation limit 121 of the first API 124.

The second API 124 from which the resource allocation limits 121 are reallocated may be determined by the resource allocation application 114 as a function of resource 127 usage with respect to the second API 124. For example, the second API 124 may comprise an API 124 whose resource 127 usage is below a threshold with respect to the corresponding resource allocation limit 121. In other embodiments, the second API 124 may be determined as a function of the corresponding resource allocation limit 121 being above a minimum threshold. For example, the second API 124 may be the one of the APIs 124 whose resource allocation limit 121 after reallocation meets or exceeds a minimum value. Other criteria may also be used to determine the second API 124 from which the resource allocation limits 121 are reallocated.

Reallocating the resource allocation limits 121 may be subject to conditions or other criteria. In some embodiments, the resource allocation limits 121 may only be reallocated if an available system or resource 127 capacity exceeds a threshold. For example, even if the resource 127 usage of a first API 124 approaches the resource allocation limit 121, the resource allocation limits 121 may only be reallocated if at least twenty-five percent of the system capacity is available.

Additionally, in embodiments in which resource allocation limits 121 are reallocated from APIs 124 having resource allocation limits 121 above a minimum threshold, the resource allocation limits 121 may be reallocated subject to there being an API 124 having a resource allocation limit 121 above the minimum threshold. Other conditions may also exist for reallocating the resource allocation limits 121.

In embodiments in which the resource allocation application 114 facilitates the allocation of the resources 127 as a function of the resource allocation limits 121, the resource allocation application 114 may allocate an amount of resources 127 to an API 124 above the corresponding resource allocation limit 121 responsive to a condition or event. For example, an amount of resources 127 allocated to an API 124 may meet the corresponding resource allocation limit 121, an increased load is being placed on the API 124, and an amount of available system capacity exceeds a minimum threshold. In such an example, the resource allocation application 114 may allocate resources 127 to the API 124 above the corresponding resource allocation limit 121.

The resource allocation application 114 may also throttle back resources 127 allocated to an API 124 above the corresponding resource allocation limit 121 subject to some condition or event. Such conditions may include, for example, the amount of allocated resources 127 exceeding the resource allocation limit 121 for a predefined amount of time, the amount of overall system capacity falling below a minimum threshold, or some other event.

Services 117 comprise functionality implemented in the computing environment 101 to facilitate the execution of applications or other services 117 executed in the computing environment 101. The services 117 may be executed to, for example, facilitate the processing of requests 134 obtained from and communicating responses 137 to clients 104. Each service 117 may implement one or more APIs 124 to facilitate their operation. The APIs 124 may be exposed to clients 104 or other functionality implemented in the computing environment 101. Each API 124 corresponds to a resource allocation limit 121 establishing a maximum threshold for resource 127 in executing calls to the API 124.

Resources 127 may comprise any capability that must be scheduled, assigned, or controlled to assure nonconflicting usage by the APIs 124. As non-limiting examples, resources 127 may comprise threads, processing power, network bandwidth, disc access, input/output traffic, database connections, used or allocated memory, socket connections, open sockets, or other computational resource used to facilitate the execution of API 124 calls.

The data stored in the data store 111 includes, for example, usage data 131, and potentially other data.

The client 104 is representative of a plurality of client devices that may be coupled to the network 107. The client 104 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 104 may be configured to execute various applications such as a client application 141 and/or other applications. The client application 141 may be executed in a client 104, for example, to access network content served up by the computing environment 101 and/or other servers. To this end, the client application 141 may comprise, for example, a browser, a dedicated application, etc. The client 104 may be configured to execute applications beyond the client application 141 such as, for example, email applications, social networking applications, word processors, spreadsheets, and/or other applications.

Next, a general description of the operation of the various components of the networked environment 100 is provided. To begin, clients 104 communicate requests 134 to the computing environment 101. Services 117 are executed to satisfy these requests 134. Satisfying the requests 134 may be facilitated by APIs 124 associated with a respective one of the services 117.

Each of the APIs 124 comprises a resource allocation limit 121 establishing a maximum amount of resources 127 that may be allocated for executing API 124 calls. The resources 127 may comprise threads, network bandwidth, disk access, or other computational functionality available in the computing environment 101.

As API 124 calls are executed to satisfy the requests 134, usage data 131 is aggregated by the resource allocation application 114. Usage data 131 may comprise an amount of transactions per second executed with respect to a corresponding one of the APIs 124, resource 127 consumption or usage, and potentially other data. The usage data 131 may be associated with a time period during which the usage data 131 was aggregated or sampled. Satisfaction of the requests 134 may further comprise communicating responses 137 to the client. API 124 calls and associated usage data 131 may be generated responsive to other events, such as internal functionality executed in the computing environment 101, or by another approach.

The resource allocation application 114 then calculates the resource allocation limits 121 of the APIs 124. The resource allocation limits 121 may be calculated or recalculated responsive to some event, condition, or other criteria. For example, the event may comprise an addition or deprecation of an API 124 to a collection of APIs 124 associated with the same service 117 or shared pool of resources 127. The event may also comprise input for a user or administrator of the computing environment 101. A condition may comprise the computing environment 101 or resource 127 usage embodying a predefined state. The resource allocation application 114 may also recalculate the resource allocation limits 121 responsive to other criteria.

Calculating the resource allocation limit 121 for an API 124 may comprise applying an aggregate function to that of the usage data 131 associated with the API 124. For example, the resource allocation application 114 may apply a weighted average to the resource 127 usage embodied in the usage data 131 with respect to the API 124. The weight applied to the usage data 131 may increase with respect to the age of the usage data 131 such that older usage data 131 receives a higher weight. Other functions may also be applied to the usage data 131 to generate the resource allocation limits 121.

The resource allocation limits 121 may also be calculated as a function of priority tiers associated with the APIs 124, or as a function of other data.

The resource allocation application 114 may reallocate resource allocation limits 121 with respect to a pair of APIs 124, thereby allowing one API 124 to "steal" resource allocation limits 121 from another API 124. Reallocating the resource allocation limits 121 may be initiated responsive to a resource 127 usage of one API 124 approaching the corresponding resource allocation limit 121. This may comprise the resource 127 usage equaling the resource allocation limit 121, exceeding a threshold generated with respect to the resource allocation limit 121, or meeting some other criteria. Reallocating the resource allocation limits 121 of a pair of APIs 124 may comprise increasing the resource allocation limit 121 of a first API 124 and decreasing the resource allocation limit 121 of a second API 124, or another approach.

In some embodiments, resource allocation limits 121 are associated with minimum threshold values. In such embodiments, the resource allocation limit 121 to be decreased may not be decreased to a value below the minimum threshold value. The minimum threshold value may be defined with respect to the corresponding API 124, applied to all APIs 124, or a subset of APIs 124.

Reallocating the resource allocation limits 121 may be performed subject to a predefined condition. For example, the resource allocation application 114 may perform a resource allocation limit 121 reallocation subject to an overall system capacity of the computing environment 101 or an available resource 127 capacity exceeding a minimum threshold. Additionally, the reallocation may be performed subject to there being at least one API whose resource allocation limit 121 exceeds a minimum threshold value.

In some embodiments, the resource allocation application 114 may calculate, recalculate, reallocate, or modify the resource allocation limits 121 subject to a maximum change threshold. The maximum change threshold embodies an amount by which a resource allocation limit 121 may be modified. The maximum change threshold may be defined with respect to a period of time. For example, a maximum change threshold may dictate that a resource allocation limit 121 may not be changed by more than ten percent of an initial value per day. The maximum change threshold may also be enforced by another approach.

After the resource allocation limits 121 have been calculated, recalculated, reallocated, or otherwise modified, the resource allocation application 114 may then modify the resources 127 allocated to the APIs 124 to reflect modified resource allocation limits 121. For example, if an amount of allocated thread resources 127 is greater than a subsequently calculated resource allocation limit 121, the resource allocation application 114 may initiate a termination of a subset of the threads allocated to the respective API 124. As another example, an API 124 whose resource allocation limit 121 is increased may have additional threads created to facilitate completion of the respective API 124 calls. Other actions may also be taken in response to the resource allocation application 114 modifying the resource allocation limits 121.

In some embodiments, the resource allocation application 114 may increase an amount of resources 127 allocated to an API 124 above the corresponding resource allocation limit 121 subject to a condition or event. For example, such conditions may include an increased load being placed on an API 124 whose allocated resources 127 meet the corresponding resource allocation limit, and an overall available system capacity exceeding a threshold. Other events or conditions may also trigger an allocation of resources 127 above a resource allocation limit 121.

If an amount of resources 127 allocated to an API 124 is above the corresponding resource allocation limit 121, the resource allocation application 114 may throttle back the amount of allocated resources 127 to meet or fall below the corresponding resource allocation limit 121 responsive to some event or condition. For example, such a condition may comprise an amount of resources 127 being allocated above the corresponding resource allocation limit 121 for a predefined amount of time. Such a condition may also comprise an amount of available system capacity falling below a threshold. Other conditions or events may also trigger a throttling back of an amount of allocated resources 127 to meet or fall below a corresponding resource allocation limit 121.

Figure 2:
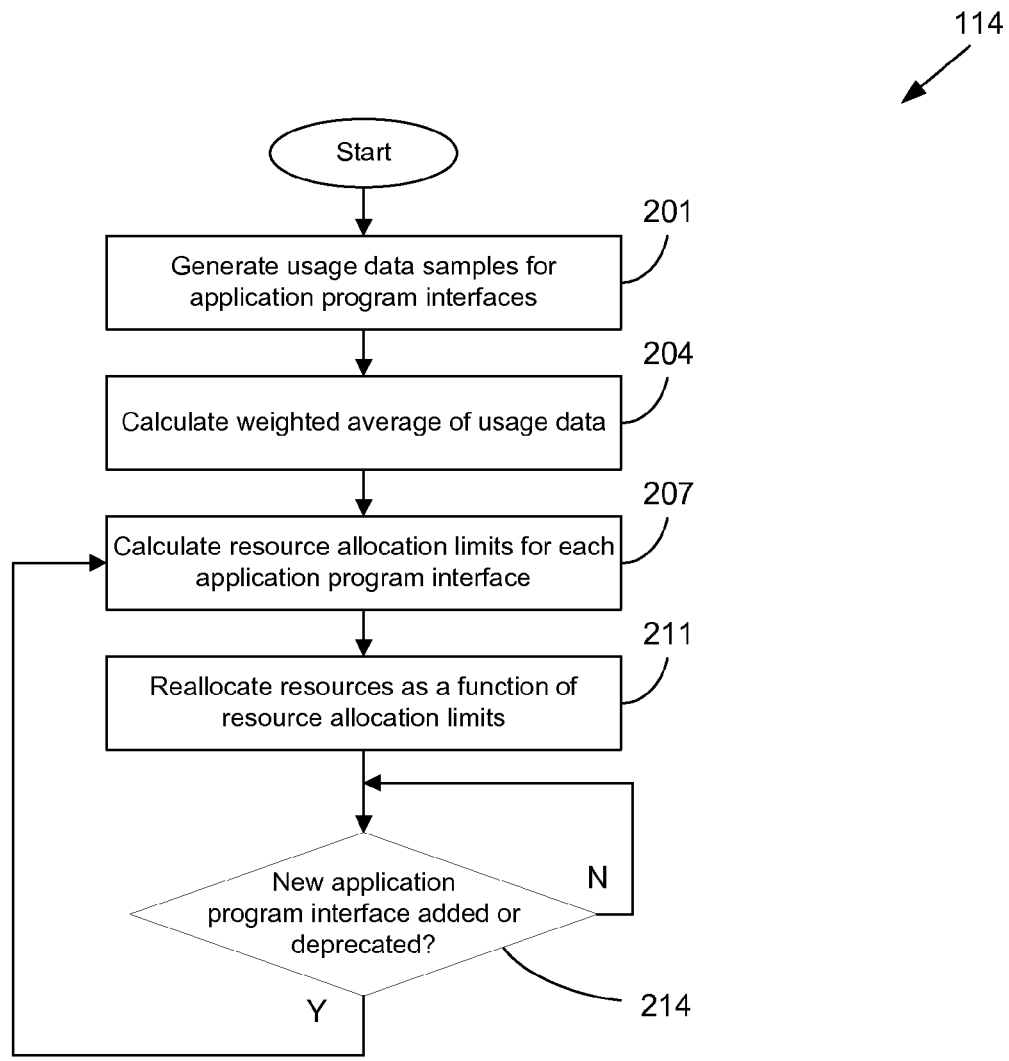
FIG. 2 is a flowchart illustrating one example of functionality implemented as portions of a resource allocation application executed in a computing environment in the networked environment of FIG. 1 according to various embodiments of the present disclosure.

Referring next to FIG. 2, shown is a flowchart that provides one example of the operation of a portion of the resource allocation application 114 (FIG. 1) according to various embodiments. It is understood that the flowchart of FIG. 2 provides merely an example of the many different types of functional arrangements that may be employed to implement the operation of the portion of the resource allocation application 114 as described herein. As an alternative, the flowchart of FIG. 2 may be viewed as depicting an example of steps of a method implemented in the computing environment 101 (FIG. 1) according to one or more embodiments.

Beginning with box 201, the resource allocation application 114 generates usage data 131 (FIG. 1) samples for a set of APIs 124 (FIG. 1). Generating the usage data 131 samples may comprise querying a data store 111 (FIG. 1) storing a collection of usage data 131. This may also comprise querying log data or other data maintained with respect to the APIs 124. Generating the usage data 131 samples may also be performed by another approach.

Next, in box 204, the resource allocation application 114 calculates a weighted average of the usage data 131 samples. This may comprise applying a weight to the usage data 131 that increases with the age of the usage data 131, or by another approach. In box 207, the resource allocation application 114 calculates the resource allocation limits 121 (FIG. 1) for each of the APIs 124. This may be performed as a function of the weighted average of the usage data 131 corresponding to a respective one of the APIs 124. This may also be performed as a function of a priority tier associated with the APIs 124, or by another approach.

In box 211, the resources 127 (FIG. 1) are reallocated as a function of the resource allocation limits 121. This may comprise decreasing an amount of resources 127 allocated to an API 124 whose resource allocation limit 121 was decreased, or another action.

In box 214, the resource allocation application 114 waits until a new API 124 has been added to the collection of APIs 124. When the API is added, the process moves to box 207, where the resource allocation limits 121 are recalculated and the amounts of allocated resources 127 adjusted in box 211.

Figure 3:
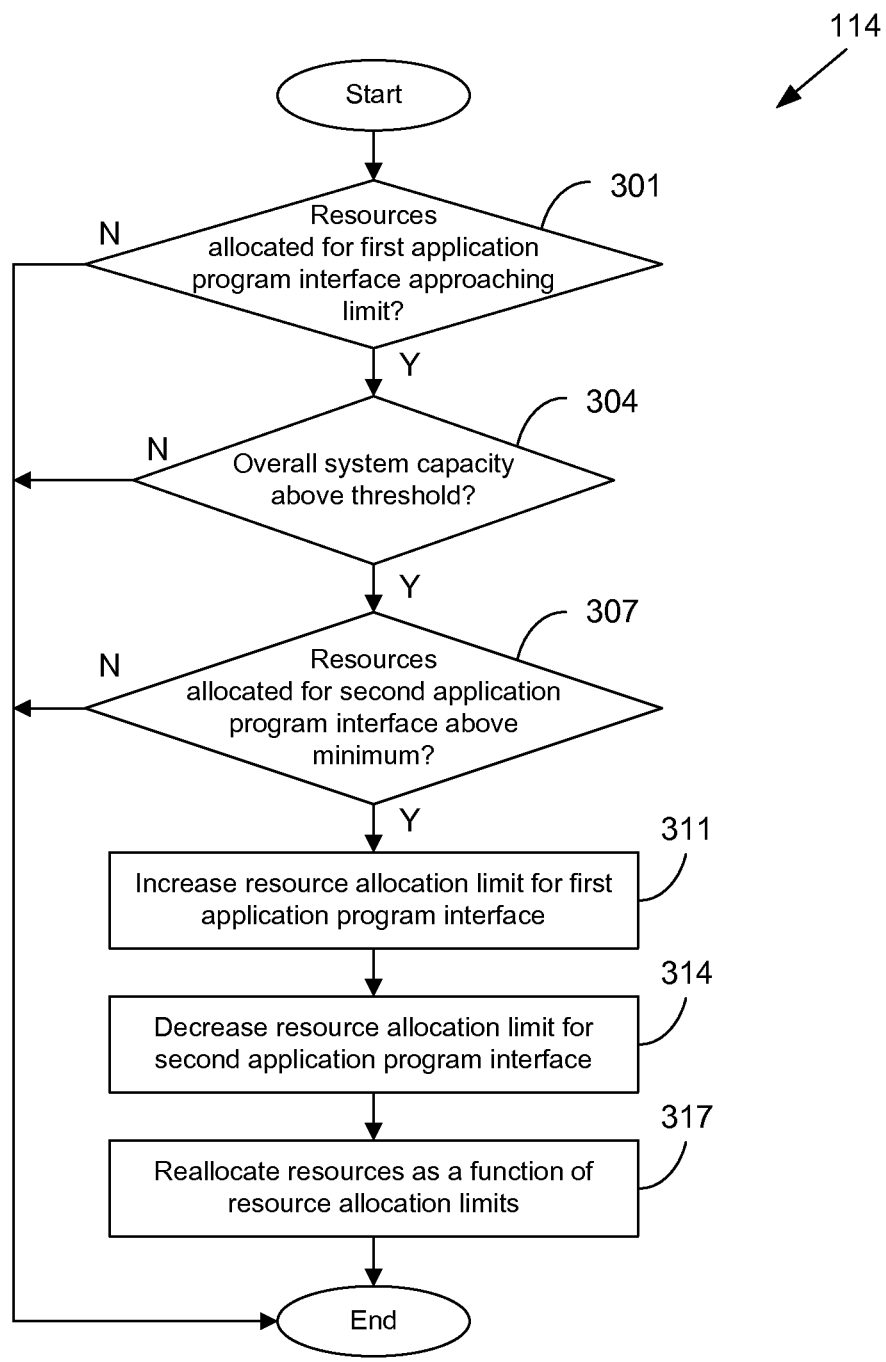
FIG. 3 is a flowchart illustrating one example of functionality implemented as portions of resource allocation application executed in a computing environment in the networked environment of FIG. 1 according to various embodiments of the present disclosure.

Referring next to FIG. 3, shown is a flowchart that provides one example of the operation of at least a portion of the resource allocation limit 121 (FIG. 1) reallocation functionality of the resource allocation application 114 (FIG. 1) according to various embodiments. It is understood that the flowchart of FIG. 3 provides merely an example of the many different types of functional arrangements that may be employed to implement the operation of the portion of the resource allocation application 114 as described herein. As an alternative, the flowchart of FIG. 3 may be viewed as depicting an example of steps of a method implemented in the computing environment 101 (FIG. 1) according to one or more embodiments.

In box 301, the resource allocation application 114 determines if the resources 127 (FIG. 1) allocated for a first API 124 (FIG. 1) is approaching the resource allocation limit 121. This may comprise determining if the allocated resources 127 equals the resource allocation limit 121, exceeds some threshold calculated with respect to the resource allocation limit 121, or exceeds some other threshold.

If the resources 127 allocated to the first API 124 do not approach the resource allocation limit 121 the process ends. Otherwise, the process proceeds to box 304, where the resource allocation application 114 determines if the overall system capacity is above a threshold. If the system capacity is below the threshold, the process ends. Otherwise, the process proceeds to box 307.

In box 307 the resource allocation application 114 determines if the resources 127 allocated to a second API 124 are above a minimum amount. The minimum may be defined with respect to the API 124, a corresponding service 117 (FIG. 1), or with respect to an entirety or a subset of the APIs 124. The minimum may also be defined as a function of other data. If the resources 127 allocated to the second API are at or below the minimum, the process ends. Otherwise, the process proceeds to box 311.

In box 311, the resource allocation limit 121 corresponding to the first API 124 is increased. In box 314, the resource allocation limit 121 corresponding to the second API 124 is increased. In box 317, resources 127 allocated to the first and second API 124 are reallocated to reflect the new resource allocation limits 121, after which the process ends.

Figure 4:
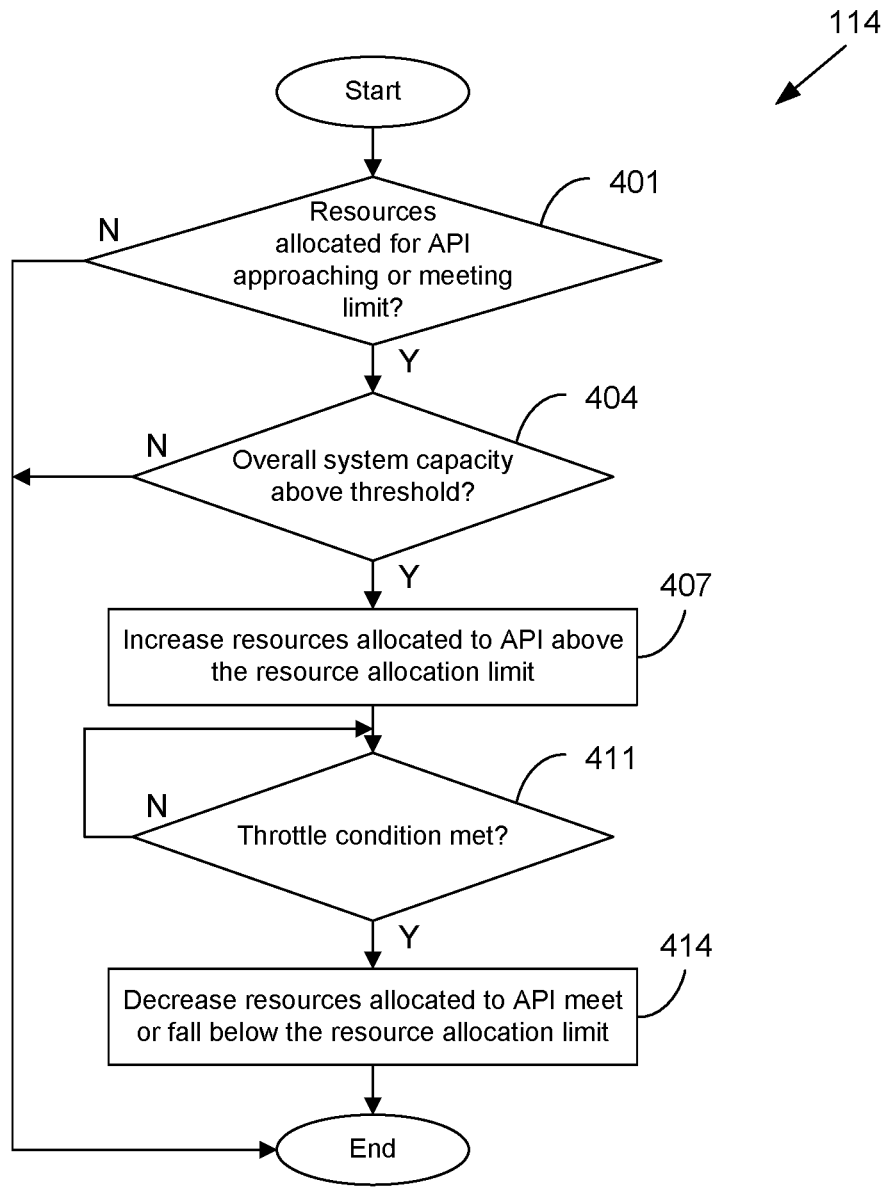
FIG. 4 is a flowchart illustrating one example of functionality implemented as portions of resource allocation application executed in a computing environment in the networked environment of FIG. 1 according to various embodiments of the present disclosure.

Referring next to FIG. 4, shown is a flowchart that provides one example of the operation of at least a portion of the resource 127 (FIG. 1) allocation functionality of the resource allocation application 114 (FIG. 1) according to various embodiments. It is understood that the flowchart of FIG. 4 provides merely an example of the many different types of functional arrangements that may be employed to implement the operation of the portion of the resource allocation application 114 as described herein. As an alternative, the flowchart of FIG. 4 may be viewed as depicting an example of steps of a method implemented in the computing environment 101 (FIG. 1) according to one or more embodiments.

In box 401, the resource allocation application 114 determines if the amount of resources 127 allocated for an API 124 (FIG. 1) is approaching or meets the corresponding resource allocation limit 121 (FIG. 1). This may comprise determining if the allocated resources 127 equals the resource allocation limit 121, exceeds some threshold calculated with respect to the resource allocation limit 121, or exceeds some other threshold.

If the resources 127 allocated to the API 124 do not approach or meet the corresponding resource allocation limit 121, the process ends. Otherwise, the process proceeds to box 404, where the resource allocation application 114 determines if the overall system capacity is above a threshold. If the system capacity is below the threshold, the process ends. Otherwise, the process proceeds to box 407.

In box 407 the resource allocation application 114 increases an amount of resources 127 allocated to the API 124 to a value above the corresponding resource allocation limit 121. In box 411, the resource allocation application 114 determines if a throttling condition is met. The throttling condition may comprise an amount of resources 127 being allocated to the API 124 above the corresponding resource allocation limit 121 for a predefined amount of time, a transaction load being placed on the API 124 falling below a threshold, an amount of available system capacity falling below a threshold, or another event. In box 414, when a throttle condition is met, the resource allocation application 114 decreases the amount of resources 127 allocated to the API 124 to an amount at or below the corresponding resource allocation limit 121, after which the process ends.

Figure 5:
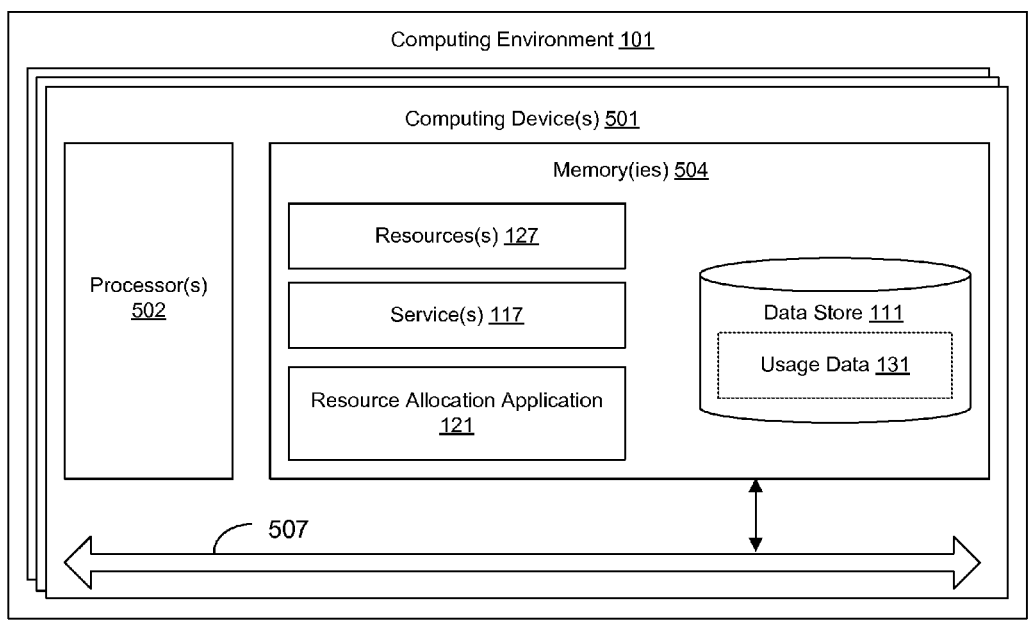
FIG. 5 is a schematic block diagram that provides one example illustration of a computing environment employed in the networked environment of FIG. 1 according to various embodiments of the present disclosure.

With reference to FIG. 5, shown is a schematic block diagram of the computing environment 101 (FIG. 1) according to an embodiment of the present disclosure. The computing environment 101 includes one or more computing devices 501. Each computing device 501 includes at least one processor circuit, for example, having a processor 502 and a memory 504, both of which are coupled to a local interface 507. To this end, each computing device 501 may comprise, for example, at least one server computer or like device. The local interface 507 may comprise, for example, a data bus with an accompanying address/control bus or other bus structure as can be appreciated.

Stored in the memory 504 are both data and several components that are executable by the processor 502. In particular, stored in the memory 504 and executable by the processor 502 are a resource allocation application 114 (FIG. 1), services 117 (FIG. 1) facilitated by resources 127 (FIG. 1), and potentially other applications. Also stored in the memory 504 may be a data store 111 (FIG. 1) and other data. In addition, an operating system may be stored in the memory 504 and executable by the processor 502.

It is understood that there may be other applications that are stored in the memory 504 and are executable by the processor 502 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 504 and are executable by the processor 502. In this respect, the term "executable" means a program file that is in a form that can ultimately be run by the processor 502. Examples of executable programs may be, for example, a compiled program that can be translated into machine code in a format that can be loaded into a random access portion of the memory 504 and run by the processor 502, source code that may be expressed in proper format such as object code that is capable of being loaded into a random access portion of the memory 504 and executed by the processor 502, or source code that may be interpreted by another executable program to generate instructions in a random access portion of the memory 504 to be executed by the processor 502, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 502 may represent multiple processors 502 and/or multiple processor cores and the memory 504 may represent multiple memories 504 that operate in parallel processing circuits, respectively. In such a case, the local interface 507 may be an appropriate network that facilitates communication between any two of the multiple processors 502, between any processor 502 and any of the memories 504, or between any two of the memories 504, etc. The local interface 507 may comprise additional systems designed to coordinate this communication, including, for example, performing load balancing. The processor 502 may be of electrical or of some other available construction.

Although the resource allocation application 114, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2, 3, and 4 show the functionality and operation of an implementation of portions of the resource allocation application 114. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 502 in a computer system or other system. The machine code may be converted from the source code, etc. If embodied in hardware, each block may represent a circuit or a number of interconnected circuits to implement the specified logical function(s).

Although the flowcharts of FIGS. 2, 3, and 4 show a specific order of execution, it is understood that the order of execution may differ from that which is depicted. For example, the order of execution of two or more blocks may be scrambled relative to the order shown. Also, two or more blocks shown in succession in FIGS. 2, 3, and 4 may be executed concurrently or with partial concurrence. Further, in some embodiments, one or more of the blocks shown in FIGS. 2, 3, and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource allocation application 114, that comprises software or code can be embodied in any non-transitory computer-readable medium for use by or in connection with an instruction execution system such as, for example, a processor 502 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, the at least one computing device having instructions that, when executed, cause the at least one computing device to at least:

calculate a plurality of resource allocation limits, each of the plurality resource allocation limits corresponding to a respective one of a plurality of application program interfaces;

recalculate the plurality of resource allocation limits responsive to a new application program interface being added to the plurality of application program interfaces;

increase a first one of the plurality of resource allocation limits responsive to a current resource usage of one of the plurality of application program interfaces corresponding to the first one of the plurality of resource allocation limits approaching the first one of the plurality of resource allocation limits; and decrease a second one of the plurality of resource allocation limits contemporaneous to increasing the first one of the plurality of resource allocation limits.

2. The non-transitory computer-readable medium of claim 1, wherein the plurality of resource allocation limits are calculated as a function of usage data associated with a past usage of the plurality of application program interfaces.

3. The non-transitory computer-readable medium of claim 1, wherein the plurality of resource allocation limits comprise a plurality of thread allocation limits.

4. A system, comprising:
at least one computing device configured to at least:
calculate a plurality of resource allocation limits, each of the plurality of resource allocation limits corresponding to a respective one of a plurality of application program interfaces;
recalculate at least a subset of the plurality of resource allocation limits responsive to an event; and
increase one of the plurality of resource allocation limits responsive to a current usage of one of the plurality of application program interfaces approaching the one of the plurality of resource allocation limits.

5. The system of claim 4, wherein the at least a subset of the plurality of resource allocation limits are recalculated as a function of a maximum allowable resource allocation limit change.

6. The system of claim 4, wherein the plurality of resource allocation limits is calculated based at least in part on usage data associated with a past usage of the plurality of application program interfaces.

7. The system of claim 4, wherein the one of the plurality of resource allocation limits is a first one of the plurality of resource allocation limits, and the at least one computing device is further configured to at least decrease a second another one of the plurality of resource allocation limits contemporaneous to increasing the first one of the plurality of resource allocation limits.

8. The system of claim 7, wherein the first one of the plurality of resource allocation limits is increased and the second one of the plurality of resource allocation limits is decreased responsive to an overall system capacity exceeding a threshold.

9. The system of claim 7, wherein the method further comprises selecting the second one of the plurality of resource allocation limits responsive to the second one of the plurality of resource allocation limits being above a minimum threshold.

10. The system of claim 7, wherein the at least one computing device is further configured to at least select the second one of the plurality of resource allocation limits corresponding to a second one of the plurality of application program interfaces responsive to a current resource usage of the second one of the plurality of application program interfaces falling below the second one of the plurality of resource allocation limits.

11. The system of claim 4, wherein the plurality of resource allocation limits comprise a maximum number of threads allocated to respective ones of the plurality of application program interfaces.

12. The system of claim 4, wherein the plurality of resource allocation limits comprise at least one of an amount of processing power, an amount of network bandwidth, an amount of disc access, or an amount of input/output traffic allocated to respective ones of the plurality of application program interfaces.

13. The system of claim 4, wherein the event comprises an addition or deprecation of one of the application program interfaces to the plurality of application program interfaces, or a passage of a predefined interval.

14. A method, comprising:
  calculating, in at least one computing device, a plurality of resource allocation limits, each of the plurality of resource allocation limits corresponding to a respective one of a plurality of application program interfaces; and
  recalculating, in the at least one computing device, at least a subset of the plurality of resource allocation limits responsive to a satisfaction of a predefined condition by:
    increasing a first one of the plurality of resource allocation limits; and
    decreasing a second one of the plurality of resource allocation limits.

15. The method of claim 14, wherein the predefined condition comprises a current usage of one of the plurality of application program interfaces approaching a corresponding one of the plurality of resource allocation limits.

16. The method of claim 14, wherein the predefined condition comprises a passage of a predefined interval.

17. The method of claim 14, wherein recalculating the at least a subset of the plurality of resource allocation limits comprises increasing at least one of the plurality of resource allocation limits in response to an amount of available system capacity meeting a predefined threshold.

18. The method of claim 14, further comprising selecting the second one of the plurality of resource allocation limits responsive to the second one of the plurality of resource allocation limits meeting a minimum resource allocation threshold.

19. The method of claim 14, wherein the predefined condition comprises a resource usage of one of the plurality of application program interfaces approaching the first one of the plurality of resource allocation limits.

20. The method of claim 14, wherein the predefined condition comprises an addition or a deprecation of one of the plurality of application program interfaces.

* * * * *